United States Patent [19]

Herbst

[11] 4,284,226
[45] Aug. 18, 1981

[54] TWO-PIECE PLEATED FOAM CUP

[75] Inventor: David H. Herbst, Reisterstown, Md.

[73] Assignee: Maryland Cup Corporation, Owings Mills, Md.

[21] Appl. No.: 63,515

[22] Filed: Aug. 3, 1979

Related U.S. Application Data

[60] Continuation of Ser. No. 872,019, Jan. 24, 1978, abandoned, which is a division of Ser. No. 704,940, Jul. 13, 1976.

[51] Int. Cl.³ .......................... B65D 3/06; B65D 3/28
[52] U.S. Cl. .................................. 229/1.5 B; 229/4.5; 229/DIG. 4; 229/2.5R
[58] Field of Search ...................... 206/218; 229/1.5 B, 229/4.5, DIG. 3, DIG. 4, 53, 2.5

[56] References Cited

U.S. PATENT DOCUMENTS

| 1,446,014 | 5/1923 | Lodge | 229/1.5 B |
| 1,968,727 | 7/1934 | Wainwright | 229/4.5 |
| 2,641,402 | 6/1953 | Bruun | 229/4.5 |
| 2,758,771 | 8/1956 | Bauer | 229/1.5 B |
| 3,312,383 | 4/1967 | Shapiro | 229/2.5 |
| 3,315,018 | 4/1967 | Commeyras | 229/2.5 |
| 3,526,316 | 9/1970 | Kalogris | 229/1.5 B |
| 3,908,523 | 9/1975 | Shikaya | 229/1.5 B |

FOREIGN PATENT DOCUMENTS 634240 3/1950 United Kingdom ................. 229/1.5 B Primary Examiner—Herbert F. Ross
Attorney, Agent, or Firm—Birch, Stewart, Kolasch & Birch

[57] ABSTRACT

A two-piece foam plastic cup is made from a rectangular blank and either a bottom disc or expandible plastic foam beads. The rectangular blank is pleated in triangular transverse pleats having their apices adjacent to the top rim or mouth of the finished cup to form a frusto-conical sidewall blank with a lapped side seam portion. This sidewall blank is placed in a heated mold with either foam plastic beads or a bottom disc and the mold is heated to fuse the pleats, fuse the lapped side seam, and expand the bottom material and sidewall material into a fused unitary cup or container structure having a sidewall of uniform thickness but with visible pleats therein, despite its resulting smooth surface.

18 Claims, 6 Drawing Figures

TWO-PIECE PLEATED FOAM CUP

This application is a continuation, of copending application Ser. No. 872,019, filed on Jan. 24, 1978, now abandoned, which is a divisional application of prior application Ser. No. 704,940, filed July 13, 1976.

FIELD OF THE INVENTION

This invention relates to plastic foam cup made from foam sheet material and more particularly to plastic foam cups made from a rectangular blank and a bottom disc, the rectangular blank being pleated to create a frusto-conical shape when folded and being joined to the bottom disc in a heated cup mold.

BACKGROUND OF THE INVENTION

It is known in the art to fabricate two piece plastic foam cups from frusto-conical blanks of sheet foam material seaming the blank to form a sidewall seam and placing a bottom blank at one end thereof and forming an additional bottom seam to complete the cup structure. It is also known in the art to place this entire cup structure in a steam-heated conformal mold to expand the foam sheet material either for the purpose of forming surface zones of higher density than the internal zones in the foam sheet material of the sidewall or for the purpose of actually heat sealing the various side and bottom seams.

All of these prior art structures require a single layer of foam of a sufficient caliper to insure sufficient stiffness and foam density in a given cup structure.

It is an object to the present invention to provide a two-piece plastic foam cup structure of the heat treated variety which is formed from a rectangular blank and which may be fabricated from a thinner caliper foam than has heretofore been possible to produce cups of the proper stiffness and foam density.

It is a further object to the present invention to produce a new and novel pleated sidewall cup structure.

SUMMARY OF THE INVENTION

Rectangular foam sheet plastic blanks are cut out of large extruded sheets and pleated with a plurality of diverging pairs of fold lines such that when pleats are formed along these fold line pairs the rectangular blank will be basically the same as a conventional cup blank and will form a sidewall substantially frusto-conical in configuration with an eight-sided appearance in its initial rough form. The material utilized may be foamed polystyrene or the like.

A cup bottom blank in the form of a circular disc of foam or the like is blanked out of a strip of sheet stock.

The folded, roughly frusto-conical, blank configuration is inserted in a two-piece frusto-conical mold assembly of the steam heated variety well known in the art for the formation of one piece plastic foam cups from expansible polystyrene beads.

Such molds typically have a male frusto-conical mandrel and a conformal female cavity which is spaced from the male mandrel the desired distance equaled to the thickness of the sidewall and bottom wall portions of a finished cup.

Accordingly, in keeping with the present invention the flat circular foam disc or bottom blank is placed on the bottom of the male mandrel in the position corresponding to the bottom of the finished cup and the frusto-conical sidewall blank assembly can either be inserted directly into the female cavity or placed around the male mandrel. The female cavity is then closed over the male mandrel to fully enclose the two pieces of the cup therein.

Once the mold parts are in position, steam or other heating medium is applied to the mold, as is conventionally known, which will cause the pleats in the sidewall blank to iron out and fuse together so that there will be no measurable difference in thickness of the foam sheet material throughout the entire sidewall portion of the cup. The application of heating medium to the mold will also cause the bottom disc to fuse to the sidewall in the formation of a bottom seam to thereby provide an integral cup assembly from the original two pieces.

Alternatively, instead of a bottom blank being formed from a disc of foam sheet material a sufficient amount of expansible polystyrene foam beads may be injected into the mold to fill the area comprising the bottom of the cup such that when the heating medium is applied to the mold the beads will fuse and expand to join with the sidewall and complete a bottom portion for the cup.

DETAILED DESCRIPTION OF THE DRAWINGS

Figure 1A:
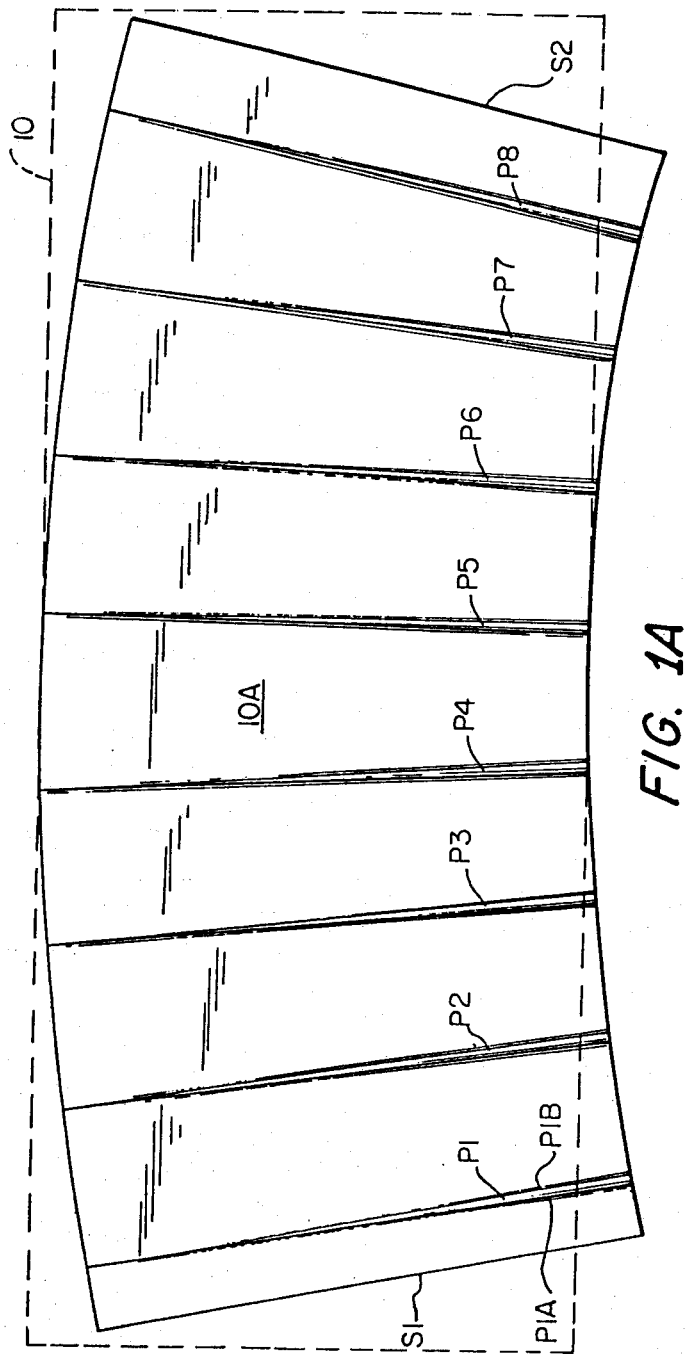
FIG. 1A is a plan view of a pleated rectangular blank in partially folded condition where it has assumed the shape of a more conventional arcuate cup blank.
Figure 1B:
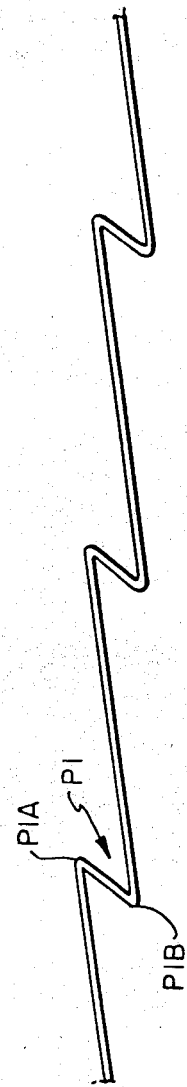
FIG. 1B is an end view of several of the pleats of FIG. 1A.

Referring in detail to FIGS. 1A and 1B a rectangular blank of foam sheet plastic material such as polystyrene, for example, of 0.020 inches in thickness (caliper) is formed into a rectangular blank 10 as indicated in dotted lines. Then, a plurality of pleats P1 thru P8 are provided intermediate the left and right hand edges S1 and S2 of the blank in a semiarcuate configuration 10A as shown in solid lines in FIG. 1A.

Each of the plates P1 thru P8 is shown as a divergent pair of lines such that an overlapping tendency is established at the bottom edge of the cup blank 10.

Figure 2:
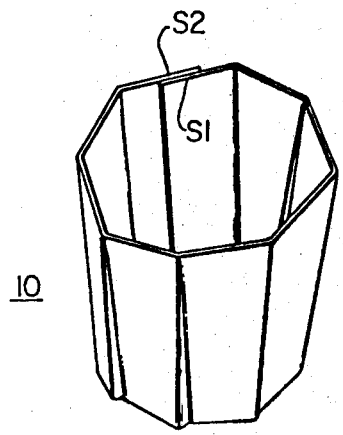
FIG. 2 is a rolled up perspective of the blank of FIG. 1 showing a sidewall blank with an eight-sided configuration and overlapping pleats.
Figure 3:
FIG. 3 is a perspective of a disc type cup bottom blank.

The blank 10 is then folded or rolled in the configuration shown in FIG. 2 wherein the left and right edges S1 and S2 of the blank are overlapped in the provision of a side seam area and a basically 8-sided, substantially frusto-conical, sidewall configuration is defined by the blank 10. A cup bottom CB comprising a disc of foam sheet plastic material, for example, is shown in FIG. 3.

In order to achieve the configuration of FIG. 2, each of the pleats P1 thru P8 has a double fold configuration which is illustrated in FIG. 1B in connection with the pleat P1.

As shown in FIG. 1B, the pleat P1 consists of a top fold line P1A and a bottom fold line P1B representing the two divergent fold lines of the pleat P1.

To achieve the configuration of FIG. 2, the fold lines P1A are folded over the divergent fold lines P1B to give an overlapping affect toward the bottom of the cup blank 10, causing the lower edge of the cup blank to assume a sharper radius than the upper edge, and thereby causing the cup blank to assume, basically, the shape of the standard frusto-conical sidewall blank of a conventional two-piece paper cup.

Figure 5:
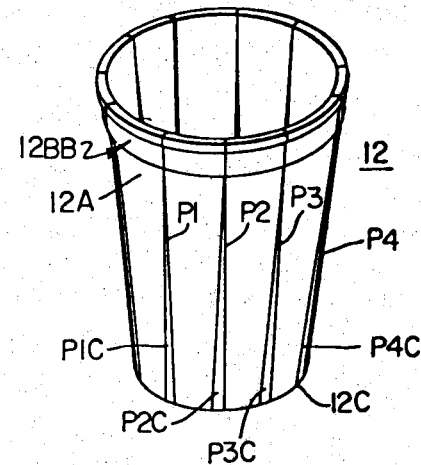
FIG. 5 is a perspective of a finished cup of the present invention.

Referring to FIG. 5, a finished cup 12 of the present invention is shown in which the pleats P1 thru P4 are shown on the sidewall of the cup as having shaded triangular areas P1C thru P4C, respectively, clearly visible on the sidewall of the cup due to the overlap of the various edges of the various pleats as basically illustrated in FIG. 1B with respect to the overlapping edges P1A and P1B.

Therefore, there is a pleated visual effect in the sidewall configuration 12A of the finished cup 12, but because of the cooking in the mold as previously described, this is a visual effect only and can not be felt since the pleats and the sidewalls have been constrained to assume identical dimensions in the thickness of the sidewall of the finished cup.

This is also true in the top curl 12B of the finished cup wherein certain vestiges of the pleats may be visually apparent but in which no feel of dimensional variation of the pleats can be detected.

Figure 4:
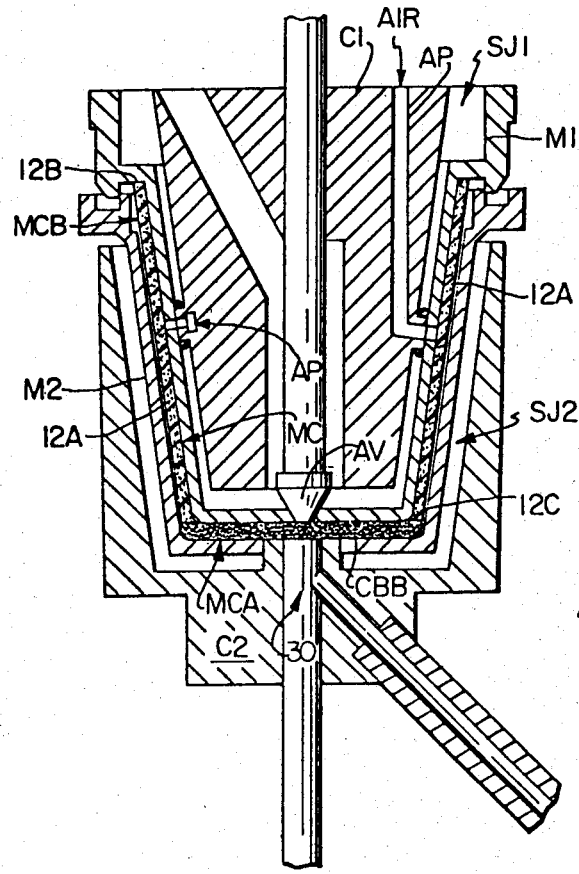
FIG. 4 is a side elevation in cross-section of a steam mold suitable for the present invention.

The finished cup of FIG. 5, with either a bottom formed from a blanked foam disc or of plastic foam beads is achieved by the use of a mold such as that shown in FIG. 4.

In a preferred embodiment of the invention in which a foam plastic drinking cup 12 having no seams is the ultimate desired container, reference will now be made to FIG. 4 in which the final forming of the process is illustrated.

The frusto-conical pleated sidewall 12A is placed in a steam-heated mold cavity MC defined by male and female mold members M1 and M2 surrounded, respectively, by steam jackets SJ1 and SJ2 in internal and external core members C1 and C2, respectively.

The lower edge 12C, the smaller end of the frusto-conical sidewall 12A, is positioned adjacent the bottom forming portion MCA of the mold cavity MC, which bottom forming portion MCA of the mold cavity MC, which bottom forming portion MCA is filled either with the blanked out bottom disc CB or with expandable polystyrene foam beads CBB (as shown) in a measured amount sufficient to expand to form a cup bottom and seal the latter to the lower edge 12C of the sidewall 12A to form a seamless final product 12 as illustrated in FIG. 5.

The beads CBB are introduced into the lower mold cavity portion MCA by a conventional charging arrangement generally illustrated at 30.

When the finished cup 12 is to be ejected from the mold, compressed air may be introduced against the bottom of the cup through bead charging valve 30 to blow the finished cup 12 from the mold. Additional air is introduced through air ports AP in the male mold core C1 against the interior of the foam cup sidewalls.

Cup molds for forming cups and containers from measured quantities of expandable polystyrene foam beads are well known in the art. Exemplary prior art patents are U.S. Pat. No. 3,125,780 of Harrison et al for Apparatus and Method for Making Plastic Containers, issued Mar. 24, 1964 and U.S. Pat. No. 3,700,175 of Harrison for Method of Making Cups, issued Aug. 10, 1965.

The polystyrene beads CBB are injected into the lower mold cavity MCA via the charging means 30 in a predetermined quantity and then the steam jackets SJ1 and SJ2 are supplied with steam from a suitable source or sources. The valve AV introduces steam directly into the lower mold cavity MCA.

The heat from the steam jackets SJ1 and SJ2 causes the beads CBB to expand and fuse to form a solid cup bottom which is fully integrated with the sidewall 12A to the extent that the lower edge 12C of the latter has disappeared and the finished cup 12 is seamless.

The upper edge 12B of the sidewall 12A is seated in the uppermost portion MCB of the mold cavity MC, the said uppermost portion MCB being formed in the shape of an ultimately desired cup rim or lip 12BB as illustrated in FIG. 5.

When the steam heat is applied to the steam jackets SJ1 and SJ2, to the mold cores C1 and C2 and mold parts M1 and M2, the sidewall 12A expands to snugly fill the entire mold cavity MC to eliminate dimensional variations at the pleats P1-P8 and take the shape of the upper mold cavity MCB to thereby produce the lip or bead portion 12BB on the ultimate seamless cup or container 12.

If the bottom disc CB is placed in the lowermost cavity MCA of the mold between the male and female mold members M1 and M2, respectively, instead of beads CBB, either before or after the frusto-conical sidewall 12A is inserted in the upper mold cavity MCB, the disc CB is preferably of slightly lesser diameter than the small end 12C of the formed sleeve 12A, thereby permitting the sleeve 12A to be first placed in the mold cavity and the bottom disc CB to be placed in the cavity through the interior of the formed sleeve 12A before the male mold portion is inserted.

Then, when the mold is closed and steam is supplied, the bottom disc CB and the lowermost portion 12C of the cup sidewall 12A will expand and fuse to form an integral cup structure.

A preferred set of parameters for cooking the cup 12 to integrate the parts thereof is as follows:

Steam is supplied at 38 psig (285°) for water for cooling is supplied at 140° F.

The mold cavity (MC, MCA, MCB) is steam purged for two seconds; then preheated via the jackets SJ1, SJ2 and valve Av for two seconds in a manner shown in the art.

The components 12A and CB (or CBS) of the cup 12 are loaded into the respective mold cavities MC and MCA and cooking steam is applied for two seconds via the jackets SJ1, SJ2 and valve AV. The same cooking time is utilized for the disk CB or beads CBB.

Cooling water is applied to the mold via the jackets SJ1, SJ2 for five seconds to complete the cooking cycle for a cup 12.

All of the pleats P1-P8 will be of the same thickness as the remainder of the sidewall 12A of the finished cup product 12 because of the expansion of the sidewalls 12A to fill the mold cavity.

Utilization of this expansion phenomenon to effect a smooth side seam in a frusto-conical cup is disclosed in U.S. Pat. No. 3,312,383 issued Apr. 4, 1967 to Arnold Shapiro, et al, for Plastic Container.

The teachings of the present invention can also be applied to cups made from conventionally shaped foam sheet sidewall blanks as shown in the above-identified patent of Shapiro, et al, by effecting all seaming of the sidewall and/or the bottom blank by the heat in the mold, thereby eliminating the need for solvent or adhesive sealing thereof. Also, the use of foam beads to form a seamless bottom on such sidewalls is clearly contemplated.

The present invention may be modified as would occur to one of ordinary skill in the art without departing from the spirit and scope of the present invention.

I claim:

1. In a container, a frustoconical sidewall structure comprising:

an arcuate blank formed from an initially rectangular blank of foam plastic sheet material;

said initially rectangular blank being provided with a plurality of pairs of divergent pleat lines defined in the surface and across the width dimension thereof, a corresponding line of each pair being overlapped with the other line of that pair to form a multi-layered triangular area for each said pair of pleat lines extending from a top portion to a bottom portion of said sidewall structure, thereby constraining said initially rectangular blank to assume an arcuate shape defining said arcuate blank;

said arcuate blank having opposing ends across the width thereof; and said opposing ends being overlapped and heat sealed together to form said frustoconical sidewall and provide a side seam for same.

2. The invention defined in claim 1 wherein said pleat lines in each pair diverge from said top portion of said sidewall structure.

3. The invention defined in claim 2, wherein said triangular areas increase in width toward said bottom portion of said sidewall structure.

4. The invention defined in claim 1, wherein said sidewall structure is of a uniform thickness throughout and characterized by a pleated visual appearance without dimensional variation.

5. The invention defined in claim 1, wherein said sidewall structure is of a uniform thickness throughout; and further wherein said sidewall structure has smooth uninterrupted outer and inner surfaces providing a pleated visual appearance without dimensional variation.

6. The invention defined in claim 1, wherein said triangular areas increase in width toward said bottom of said sidewall structure; and wherein said sidewall structure is of a uniform thickness throughout and characterized by a pleated visual appearance without dimensional variation.

7. The invention defined in claim 6, wherein said sidewall structure is of a uniform thickness throughout; and further wherein said sidewall structure has smooth uninterrupted outer and inner surfaces providing a visual pleated appearance without dimensional variation.

8. In a container, a frustoconical sidewall structure comprising:

an arcuate blank formed from an initially rectangular blank of foam plastic sheet material;

said initially rectangular blank being provided with a plurality of pairs of divergent pleat lines defined in the surface of said blank across the width dimension thereof, a corresponding line of each pair being overlapped with the other line of that pair to form a multi-layered triangular area for each said pair of pleat lines and said pleat lines in each pair diverging from a top portion of said sidewall structure thereby constraining said initially rectangular blank to assume an arcuate shape defining said arcuate blank;

the layers overlapped in each of said multi-layered triangular areas being bonded together in said sidewall structure to provide a unitary structure;

said arcuate blank having opposing ends across the width thereof; and said opposing ends being overlapped and heat-sealed together to form said frustoconical sidewall structure and provide a side seam for same.

9. The invention defined in claim 8, wherein said triangular areas increase in width toward a bottom portion of said container sidewall structure.

10. The invention defined in claim 8, wherein said sidewall structure is of a uniform thickness throughout and characterized by a pleated visual appearance without dimensional variation.

11. The invention defined in claim 8, wherein said sidewall structure is of a uniform thickness throughout; and further wherein said sidewall structure has smooth uninterrupted outer and inner surfaces providing a pleated visual appearance without dimensional variation.

12. A container made by the method comprising the steps of:

providing a rectangular blank of plastic foam sheet material;

forming a plurality of pairs of divergent pleat lines across the width dimension of said blank;

overlapping one pleat line with the other to form triangular double layers in said blank, thereby constraining said blank to assume an arcuate shape;

overlapping the opposite edges of said blank in a side seam configuration to form a multi-sided, substantially frusto-conical cup sidewall assembly;

placing said sidewall assembly in a conforming mold means;

providing a bottom blank in said mold means at one end of said sidewall assembly; and applying heat thereto to fuse said overlapping areas and heat seal said side seal configuration and said bottom blank to said sidewall assembly to provide a unitary cup structure.

13. The container by the method of claim 12, wherein in said method said mold includes steam jacket means for heating same; and wherein said application of heat is made by admitting steam to said mold.

14. The container by the method of claim 13, wherein in said method said steam is applied to said mold at a temperature and for a duration sufficient to expand said sidewall material into uniform thickness with said overlapping areas throughout the sidewall portion of said container.

15. The container by the method of claim 12, wherein in said method said mold is heated to a sufficient temperature to expand said sidewall material into uniform thickness with said overlapping areas.

16. The container by the method of claim 15, wherein in said method said mold includes an annular top bead cavity; and wherein said sidewall is sufficiently expanded to fill and conform to said top bead cavity in the provision of a top bead configuration on a finished container.

17. A frustoconical sidewall structure made by the following method of forming a hollow frustoconical foam plastic structure from a rectangular blank of foam plastic sheet material comprising:

forming a plurality of pairs of divergent pleat lines across the width dimension of said blank;

overlapping one pleat line with the other to form triangular double layers in said blank, thereby constraining said blank to assume an arcuate shape;

overlapping the opposite edges of said blank in a side seam configuration; and pressing and heat sealing said side seam and said triangular double layers to provide a frustoconical hollow structure.

18. The frustoconical sidewall structure by the method of claim 17, said method including:

confining said arcuate blank in a conformal frustoconical die during said pressing and heat sealing and applying heat uniformly thereto to expand said foam sheet material and said overlapped triangular areas to a uniform thickness.

* * * * *